United States Patent
Paiement et al.

(10) Patent No.: US 12,481,899 B2
(45) Date of Patent: Nov. 25, 2025

(54) AUTOMATED MACHINE LEARNING MODEL EXPLANATION GENERATION

(71) Applicant: AT&T Intellectual Property I, L.P., Atlanta, GA (US)

(72) Inventors: Jean-Francois Paiement, Palm Desert, CA (US); Eric Zavesky, Austin, TX (US); Zhengyi Zhou, Chappaqua, NY (US); David Gibbon, Lincroft, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1003 days.

(21) Appl. No.: 17/562,808

(22) Filed: Dec. 27, 2021

(65) Prior Publication Data

US 2023/0206096 A1 Jun. 29, 2023

(51) Int. Cl.
*G06N 3/04* (2023.01)
*G06N 3/045* (2023.01)
*G06N 5/04* (2023.01)
*G06N 5/045* (2023.01)
*G06N 20/20* (2019.01)

(52) U.S. Cl.
CPC .......... *G06N 5/045* (2013.01); *G06N 3/045* (2023.01); *G06N 20/20* (2019.01)

(58) Field of Classification Search
CPC ................................ G06N 3/045; G06N 5/045
See application file for complete search history.

(56) References Cited

U.S. PATENT DOCUMENTS

| | | | |
|---|---|---|---|
| 11,568,212 B2* | 1/2023 | Öztireli | G06F 17/18 |
| 2021/0279618 A1* | 9/2021 | Wang | G06N 20/00 |
| 2023/0031512 A1* | 2/2023 | Sousa | G06N 3/096 |
| 2024/0249299 A1* | 7/2024 | Cohen | G06N 5/045 |

OTHER PUBLICATIONS

Broniatowski, David A., and David A. Broniatowski. Psychological foundations of explainability and interpretability in artificial intelligence. vol. 4. US Department of Commerce, National Institute of Standards and Technology, 2021. (Year: 2021).*

Wang, Xiting, et al. "A reinforcement learning framework for explainable recommendation." 2018 IEEE international conference on data mining (ICDM). IEEE, 2018. (Year: 2018).*

Nair, Rahul, et al. "What Changed? Interpretable Model Comparison." IJCAI. 2021. (Year: 2021).*

Obeid, J., et al., "Chart-to-Text: Generating Natural Language Descriptions for Charts by Adapting the Transformer Model", Computer Science, Computation and Language, Nov. 29, 2020, https://doi.org/10.48650/arXiv.2010.09142, 10 pages.

Foong, N.W., "Beginner's Guide to Retrain GPT-2 (117M) to Generate Custom Text Content", May 12, 2019, accessed from https://medium.com/ai-innovation/beginners-guide-to-retrain-gpt-2-117m-to-generate-custom-text-content-8bb5363d8b7f, 21 pages.

(Continued)

*Primary Examiner* — Hal Schnee (57) ABSTRACT

A processing system including at least one processor may obtain description information of a first machine learning model, obtain a set of interpretation criteria for the first machine learning model, and generate, via a second machine learning model, an explanation text providing an interpretation of the first machine learning model in accordance with the set of interpretation criteria and the description information of the first machine learning model.

20 Claims, 4 Drawing Sheets

(56) References Cited

OTHER PUBLICATIONS

Gong, L., et al., "Enhanced Transformer Model for Data-to-Text Generation", Proceedings of the 3$^{rd}$ Workshop on Neural Generation and Translation (WNGT 2019), pp. 148-156.
Fiddler, "Know the why and the how behind your AI solutions", accessed on Nov. 23, 2021 from //www.fiddler.ai/explainable-ai, 10 pages.
Barzilay, R., et al., "Collective Content Selection for Concept-To-Text Generation", Proceedings of Human Language Technology Conference and Conference on Empirical Methods in Natural Language Processing (HLT/EMNLP) Oct. 2005, pp. 331-338.
Radford, A., et al., "Improving Language Understanding by Generative Pre-Training", accessed on Nov. 23, 2021 from https://cdn.openai.com/research-covers/language-nsupervised/language_understanding_paper.pdf, 12 pages.
Mljar, "Automated Machine Learning, ML Explainability" accessed on Mar. 28, 2022 from https://mljar.com/automated-machine-learning/explainability/, 9 pages.
H2O.ai, "Model Explainability", access on Mar. 28, 2022 from https://docs.h2o_ai/h2o/latest-stable/h2o-docs/explain.html, 16 pages.
Azure Machine Learning, "Interpretability: Model explainability in automated ML (preview)", Nov. 5, 2021, accessed from https://docs.microsoft.com/en-us/azure/machine-learning/how-to-machine-learning-interpretability-automl, 12 pages.
Azure Machine Learning, "Model interpretability in Azure Machine Learning (preview)", Mar. 15, 2022, accessed from https://docs.microsoft.com/en-us/azure/machine-learning/how-to-machine-learning-interpretability, 8 pages.
Brownlee, J., "Text Generation With LSTM Recurrent Neural Networks in Python with Keras", Deep Learning Mastery, Sep. 3, 2020, accessed from https://machinelearningmastery.com/text-generation-lstm-recurrent-neural-networks-python-keras/, 112 pages.
Azure Learning Machine, Use the Python interpretability package to explain ML models & predictions (preview), Jan. 27, 2022, accessed from https://docs.microsoft.com/en-us/azure/machine-learning/how-to-machine-learning-interpretability-aml, 22 pages.

* cited by examiner

AUTOMATED MACHINE LEARNING MODEL EXPLANATION GENERATION

The present disclosure relates generally to machine learning model deployment and operations, and more particularly to methods, computer-readable media, and apparatuses for generating, via a second machine learning model, an explanation text providing an interpretation of a first machine learning model in accordance with a set of interpretation criteria and description information of the first machine learning model.

BACKGROUND

Machine learning in computer science is the scientific study and process of creating algorithms based on data to perform a task without any specific instructions. These algorithms are called models and different types of models can be created based on the type of data that the model takes as input and also based on the type of task (e.g., prediction, classification, or clustering) that the model is trying to accomplish. The general approach to machine learning involves using the training data to create the model, testing the model using the cross-validation and testing data, and then deploying the model to be used by real-world applications.

SUMMARY

In one example, the present disclosure provides a method, computer-readable medium, and apparatus for generating, via a second machine learning model, an explanation text providing an interpretation of a first machine learning model in accordance with a set of interpretation criteria and description information of the first machine learning model. For example, a processing system including at least one processor may obtain description information of a first machine learning model, obtain a set of interpretation criteria for the first machine learning model, and generate, via a second machine learning model, an explanation text providing an interpretation of the first machine learning model in accordance with the set of interpretation criteria and the description information of the first machine learning model.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, non-transitory (i.e., tangible or physical) computer-readable media, and apparatuses for generating, via a second machine learning model, an explanation text providing an interpretation of a first machine learning model in accordance with a set of interpretation criteria and description information of the first machine learning model. In particular, due to the complexity of machine learning models (MLMs), most MLMs operate as a black box, which causes ethical, design, and human understanding issues. Some interpretability techniques may rely on feature models and rebuilding of partial structures, and attempt to provide insight into aspects of MLMs. However, different audiences may be best served by different interpretations/explanations having different levels of details, focus on different aspects, usage of particularized terminology, more or less details with respect to certain factors, and so on, which may not be possible with a single summarization system. For example, the details of a medical report may be important for a clinician but not the patient, who seeks only a summary level view. In addition, new MLMs are increasing being trained and developed with less understanding of the underlying methods, such as AutoML (automated machine learning (ML)). Examples of the present disclosure may quickly offer interpretations/explanations of what a MLM does, the MLMs impacting factors on both the decisions and how it accommodates certain input data, and so forth. For example, an interpretation/explanation may summarize treatment of children versus adults (demographics from the training data) and do so for important output decisions (such as declaring that children in county X vs. Y are more susceptible to infection than adults in similar locations).

To illustrate, examples of the present disclosure may generate human-understandable (e.g., textual) explanations of MLM performance and attributes. For instance, given inputs of an MLM, a domain of samples, and one or more examples of an explanation for a target audience, the present disclosure may customize a textual/natural language explanation for a target audience using exemplars for the target audience, which may be tailored for technical expertise, areas of interest within the data, and so forth. In one example, new MLMs may be trained in parallel with training an explanation/interpretation MLM, which may have its own training data and interpretation requirements, both of which can be domain specific or have intrinsic styles to be learned via the training.

For example, the present disclosure may train/generate an explanation/interpretation MLM (e.g., a "second MLM") by starting with an initial, subject MLM (e.g., a "first" MLM) and prior textual/natural language explanations/interpretations of the MLM output(s). For instance, a direct domain expert or example documentation can be obtained, e.g., a conversation between a medical professional and a patient may be recorded and categorized as part of these initial training data. The explanation data may be quantified for tone, the depth/specificity, and specific words, phrases, and other features that may be most relevant to the context (e.g., a target audience of "patient"). In one example, the explanation/interpretation MLM may alternatively or additionally be trained using a corpus of legal, medical, or marketing text (e.g., original written text or transcribed conversations or other speech), which may provide a basis for the explanation/interpretation MLM to learn common phrases within a relevant domain for textual synthesis.

In one example, a user may specify a "subclass" of both the subject model and/or the input or output data (a part of feature/sample space to focus on) and/or of the textual explanation. In one example, the present disclosure may provide a menu of options for the user to so specify. Alternatively, or in addition, the present disclosure may solicit one or more preferences via a system dialog/question-and-answer interface. In still another example, the user may specify a target audience (e.g., a target audience type). In any case, the present disclosure may then use these preferences as a set of interpretation criteria. In other words, these may comprise "optimization" criteria for use in the system. For instance, the explanation/interpretation MLM may be optimized via training for readability (of text), complexity of explanation (text/audio), amount of loss or "compression" of information, what can be summarized and what is important to include in an explanation, or the like. In one example, users consuming the explanations can give ratings or give explicit inclusion/exclusion parameters (e.g. demographics, financial impact, etc.).

In one example, the subject MLM may be run on certain training data (e.g., wherein the training data is for training the subject/first MLM). For example, the subject MLM may already be trained and deployed. Thus, in one example, the present disclosure may analyze the varying outputs versus the inputs. This can be through statistical correlation, secondary training models, and so forth. Alternatively, or in addition, for an MLM that uses reinforcement learning (RL) in "build" and "combine" mode, the present disclosure may engage in feature importance learning (e.g., ablation, threshold, etc.). Alternatively, the model construction phase may be executed in an RL framework. For instance, a reward may be based on an explainability metric (e.g., an interpretation criterion), a user comprehension metric, or an acceptance of an explanation by a user. In one example, an action may be a combination of different model factors. In either mode, secondary datasets can be added that contain auxiliary data (e.g., demographics, medial history, content preferences, etc.) that look for additional points of explainability. In addition, in one example, ensemble model runs may be executed to aggregate multiple sessions and factors. For instance, an analysis of one or more datasets may find dominant or anomalous factors from the summary.

A trained explanation/interpretation MLM may synthesize a textual explanation, e.g., an interpretation or description for use/consumption by a user or audience. In one example, the explanation/interpretation MLM may generate explanations in a domain specific formatting, e.g., for a legal audience, a medical audience, an insurance audience, a marketing audience, etc. In one example, the explanation/ interpretation MLM may prioritize factors that were included after detection in a training corpus (that may be used for explicit text or visual generation). With priority, some of these factors may be omitted for a shorter summarization, e.g., by prioritizing/ordering factors based upon impact or importance. In one example, the present disclosure may also provide interactive exploration of the system. For instance, an interactive text explanation can reuse an MLM from a prior stage to generate increasing length and complexity of explanation after user "clicks" on an area of text. Similarly, the present disclosure may include an output stage to "summarize" a paragraph into a brief sentence or summary graphic, as an alternative or in addition to expansion. In one example, different factors can be visualized with a hierarchy, dropdown, or "zoom" method where the user can increasingly inspect and flag items to visualize. In one example, the present disclosure may obtain feedback to understand what factors are most useful or interesting for each user. In addition, the feedback may be aggregated for different groups or types of users, e.g., "patients," "medical professionals," etc.

Thus, examples of the present disclosure may generate an explanation/interpretation MLM that is trained/configured to provide textual/natural language explanations/interpretations for different audiences with respect to an existing MLM, or a new subject MLM. Users may describe the targets and the desired insights for the subject MLM making predictions, classifications, etc. For example, with regard to medical data, the explanation/interpretation MLM may be trained/configured to output a high level explanation to a patient or a more complete interpretation for a medical professional. Similarly, the explanation/interpretation MLM may also be trained/configured to provide an output with different interpretation(s) for legal professionals, for model developers, etc. In one example, the generating/training may involve discovering confidence intervals for the data (e.g., for finding critical errors), bias discovery after utilization on specific type(s) of data (e.g., held out group(s), etc.), cost discovery for changes in the subject MLM or its architecture (e.g., sensitivity to a changed parameter, or parameters), and so on. The training of the explanation/interpretation MLM may include adaptation/learning to ascribe the human descriptions of a model to the auto metrics of the model. In one example, the explanation/interpretation MLM may be trained from a collection of existing model descriptions (e.g., from many metrics, learning which is most salient for an audience, possibly recasting for style).

In one example, the explanation/interpretation MLM may learn which features have the most overall impact (e.g., from among the input feature(s), the MLM parameters, etc.). In addition to a natural-language, textual output, the present disclosure may also provide an interactive interface, such as checkboxes for understanding which items are utilized in an explanation/interpretation. In another example, the explanation/interpretation output may be comprised of one or more video or image assets. These assets may be provided to the system a-priori as demonstrative results of a feature. For example, a feature indicating high diabetes likelihood may be connected to an informative video about diabetes. The assets may also be generated as part of the explanation/ interpretation to illustrate the differences in values and decisions of the MLM. For instance, one explanation related to the strength of resultant customer loyalty may be animated to improve as certain other input features are changed. Thus, in addition to automatically generating different types of outputs for different target audiences, the present disclosure may also generate different types of explanations based upon user selections e.g., closest example, cohort comparison, counterfactual example(s), interpretation of subject MLM for a single sample, etc. For instance, if the subject MLM is outputting a decision regarding whether to grant or deny a loan to a particular applicant, a user, such as a loan officer, may select for the explanation/interpretation MLM to provide the top four reasons of the decision. Similarly, a user may request that the output specifically include one or more contrastive examples, and alternatively or additionally may have the option to obtain insights into failure points or similar cohorts.

Thus, examples of the present disclosure provide a "simple" distillation of explanations to text, e.g., natural-language text, and may be presented in text form (visually) or as audio output (e.g., text-to-speech). Examples of the present disclosure may also provide interactive capabilities to explore with contrastive and counter-factual understanding of a decision. For instance, for a specific decision regarding an input instance, the present disclosure may find, summarize, and present examples of a cohort including the input instance and/or other contrastive cohorts. In addition, for single decisions, the present disclosure may also point out specific changes in values that isolate/trigger decision points.

In one example, the present disclosure may also comprise a virtual assistant (assistive coach) that is semi-personalized for a practitioner or certain style (e.g., the explanation/interpretation MLM may be tuned to the preferences of a practitioner to highlight specific items). For example, the explanation/interpretation MLM may learn from user feedback over time that a medical professional prefers only life-altering impacts to be highlighted from a subject MLM. In one example, the present disclosure may generatively add more details for a given explanation. For instance, an output explanation may start with a specific seed (general explanation) that may be expanded for more reasoning and understanding of the subject MLM, its inputs, and/or its outputs, or reduced for a more general summary. In addition, it should again be noted that the present disclosure may enhance (or combine) an existing subject MLM with new data and structural constraints (e.g., modification of the MLM (e.g., the MLM parameters or hyperparameters) or the running environment) for additional insights. For instance, this may be used to understand how a subject MLM applies to specific demographics that may or may not exist in an original training data set and/or runtime input data set. In addition, the present disclosure adds new capabilities during model development to gather insights while models are trained and augmented, including examples of AutoML.

In one example, the present disclosure may present an interface for users or developers to provide feedback to improve the explanation model, such as enabling a user to point out portions where the explanation is unclear, not relevant to the user's information needs or preferences (e.g., not necessary for the target audience), and so forth. In addition, in one example, the present disclosure may regenerate explanation text for specific factors that a user provides, as an alternative or in addition to explicitly linking or identifying initial features. Thus, examples of the present disclosure tailor interpretations/explanations for different audiences (differentiated by simplicity/complexity, language (e.g., domain specific vocabularies), style, context, etc.) in a manner not previously possible without involved subject matter expert analysis of the subject MLM. It should also be noted that natural-language, textual explanations may be used in combination with charts, graphics, animations, or the like, which may further provide change-highlighting renderings, such as for insights regarding feature change impacts, training data and/or runtime input data cohort differences, and so on. These and other aspects of the present disclosure are discussed in greater detail below in connection with the examples of FIGS. 1-4.

Figure 1:
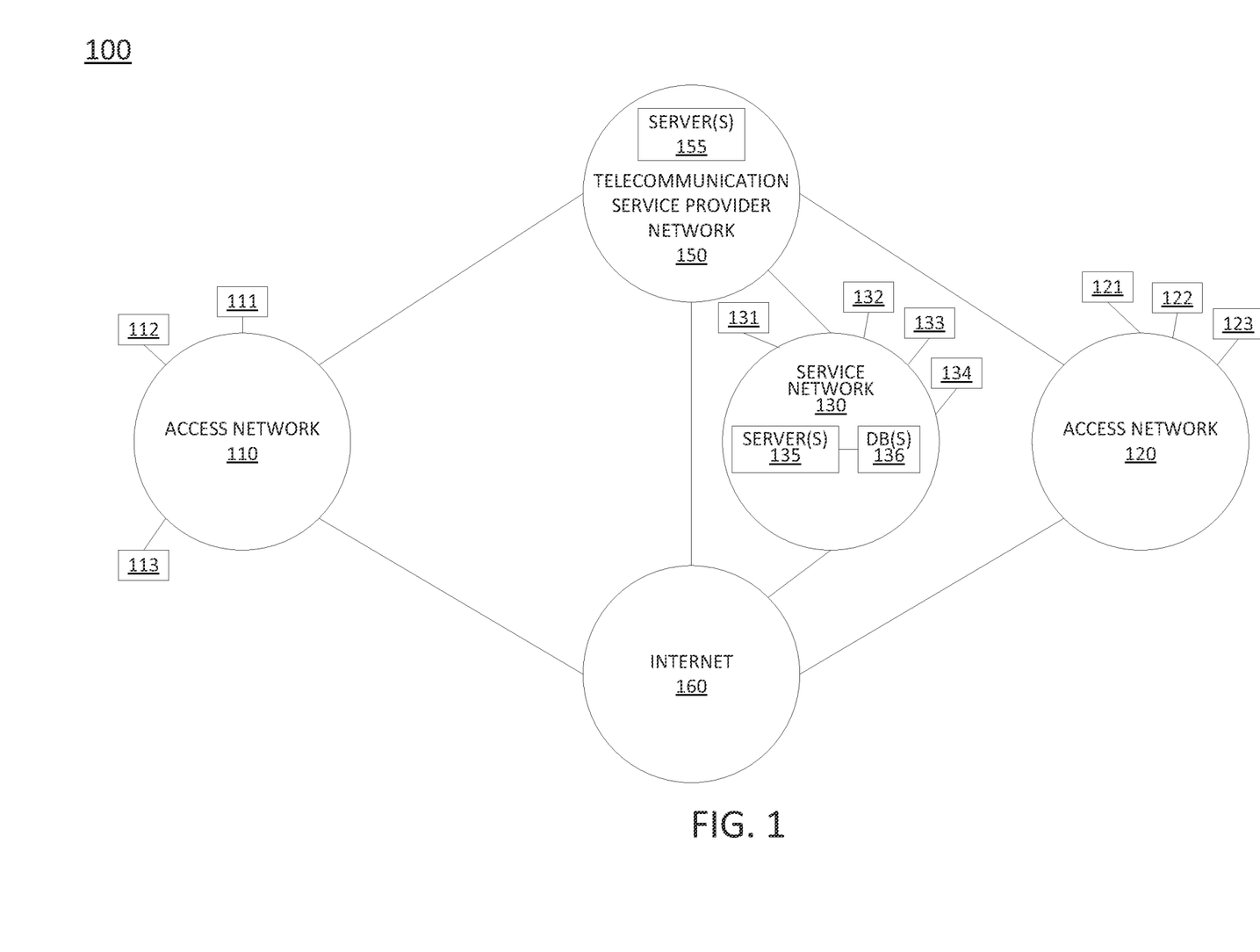
FIG. 1 illustrates one example of a system including a telecommunication network, according to the present disclosure.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more servers 155. In one example, the servers 155 may each comprise a computing device or processing system, such as computing system 400 depicted in FIG. 4, and may be configured to host one or more centralized and/or distributed system components. For example, a first system component may comprise a database of assigned telephone numbers, a second system component may comprise a database of basic customer account information for all or a portion of the customers/subscribers of the telecommunication service provider network 150, a third system component may comprise a cellular network service home location register (HLR), e.g., with current serving base station information of various subscribers, and so forth. Other system components may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. In addition, other system components may include, for example, a layer 3 router, a short message service (SMS) server, a voicemail server, a video-on-demand server, a server for network traffic analysis, and so forth. It should be noted that in one example, a system component may be hosted on a single server, while in another example, a system component may be hosted on multiple servers in a same or in different data centers or the like, e.g., in a distributed manner. For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user/subscriber devices. In addition, in one example, any of endpoint devices 111-113 and 121-123 may comprise a device of an end-user (e.g., of an automated MLM explanation service, as referred to herein).

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may comprise a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. As such, service network 130 may represent aspects of telecommunication service provider network 150 where infrastructure for supporting such services may be deployed.

Figure 2:
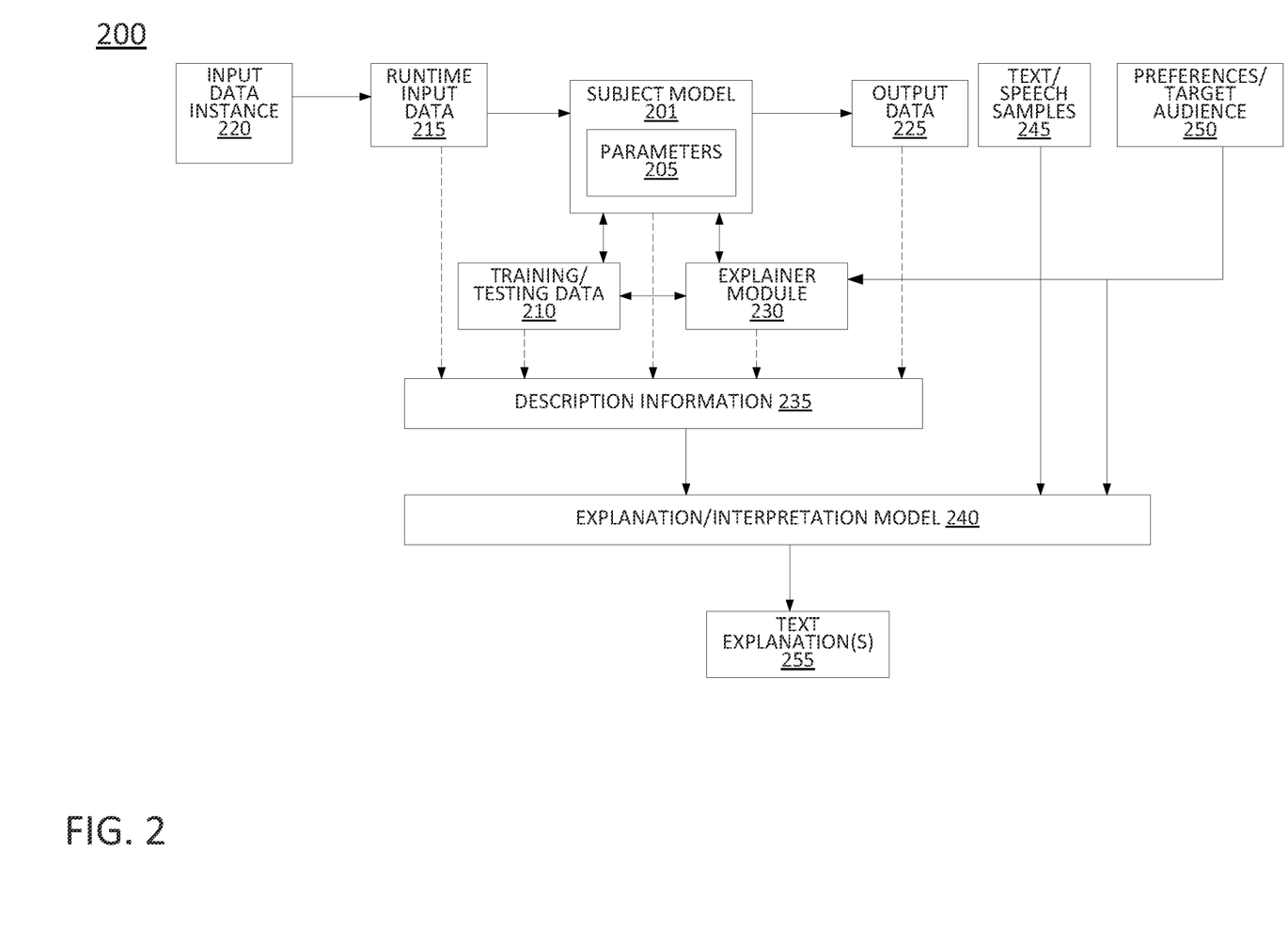
FIG. 2 illustrates an example architecture of a machine learning model automated explanation platform or system.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as customer service agents, sales agents, marketing personnel, or other employees or representatives who are tasked with addressing customer-facing issues and/or personnel for network maintenance, network repair, construction planning, and so forth. Similarly, devices 131-134 of the service network 130 may comprise devices of network personnel responsible for operating and/or maintaining an automated MLM explanation unit or processing system, such as illustrated in FIG. 2 and described in greater detail below.

In the example of FIG. 1, service network 130 may include one or more servers 135 which may each comprise all or a portion of a computing device or processing system, such as computing system 400, and/or a hardware processor element 402 as described in connection with FIG. 4 below, specifically configured to perform various steps, functions, and/or operations for generating, via a second machine learning model, an explanation text providing an interpretation of a first machine learning model in accordance with a set of interpretation criteria and description information of the first machine learning model, as described herein. For example, one of the server(s) 135, or a plurality of servers 135 collectively, may perform operations in connection with the example method 300 of FIG. 3, or as otherwise described herein. Similarly, one or more of the server(s) 135 may represent an automated MLM explanation unit or processing system, such as illustrated in FIG. 2 and described in greater detail below. In other words, one or more of the server(s) 135 may provide an automated MLM explanation service.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 4 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of examples of the present disclosure for generating, via a second machine learning model, an explanation text providing an interpretation of a first machine learning model in accordance with a set of interpretation criteria and description information of the first machine learning model. As just one example, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, television usage information, such as live television viewing, on-demand viewing, etc., and other information and statistics, which may then be compiled and processed, e.g., normalized, transformed, tagged, etc., and forwarded to DB(s) 136, such as via one or more of the servers 155. In one example, such network operational data may further include data and/or records collected from access networks 110 and 120 (e.g., where access networks 110 and 120 are a part of and/or controlled by telecommunication service provider network 150).

In one example, DB(s) 136 may be configured to receive and store records from customer, user, and/or subscriber interactions, e.g., with customer facing automated systems and/or personnel of a telecommunication network service provider or other entities associated with the service network 130. For instance, DB(s) 136 may maintain call logs and information relating to customer communications which may be handled by customer agents via one or more of the devices 131-134. For instance, the communications may comprise voice calls, online chats, etc., and may be received by customer agents at devices 131-134 from one or more of devices 111-113, 121-123, etc. The records may include the times of such communications, the start and end times and/or durations of such communications, the touchpoints traversed in a customer service flow, results of customer surveys following such communications, any items or services purchased, the number of communications from each user, the type(s) of device(s) from which such communications are initiated, the phone number(s), IP address(es), etc. associated with the customer communications, the issue or issues for which each communication was made, etc.

Alternatively, or in addition, any one or more of devices 131-134 may comprise an interactive voice response system (IVR) system, a web server providing automated customer service functions to subscribers, etc. In such case, DB(s) 136 may similarly maintain records of customer, user, and/or subscriber interactions with such automated systems. The records may be of the same or a similar nature as any records that may be stored regarding communications that are handled by a live agent. Similarly, any one or more of the devices 131-134 may comprise a device deployed at a retail location that may service live/in-person customers. In such case, the one or more of devices 131-134 may generate records that may be forwarded and stored by DB(s) 136. The records may comprise purchase data, information entered by employees regarding inventory, customer interactions, surveys responses, the nature of customer visits, etc., coupons, promotions, or discounts utilized, and so forth. In still another example, any one or more of the devices 111-113 or 121-123 may comprise a device deployed at a retail location that may service live/in-person customers and that may generate and forward customer interaction records to DB(s) 136.

The various data and/or records collected from various components of telecommunication service provider network 150 (e.g., server(s) 155), access networks 110 and 120, and/or service network 130 may be organized into and referred to as "datasets." This includes both "streaming" and "batch" data, or both "data at rest" and "data in motion."

In one example, DB(s) 136 may alternatively or additionally receive and/or store data from one or more external entities. For instance, DB(s) 136 may receive and store weather data from a device of a third-party, e.g., a weather service, a traffic management service, etc. via one of access networks 110 or 120. To illustrate, one of endpoint devices 111-113 or 121-123 may represent a weather data server (WDS). In one example, the weather data may be received via a weather service data feed, e.g., an NWS extensible markup language (XML) data feed, or the like. In another example, the weather data may be obtained by retrieving the weather data from the WDS. In one example, DB(s) 136 may receive and store weather data from multiple third-parties. In still another example, one of endpoint devices 111-113 or 121-123 may represent a server of a traffic management service and may forward various traffic related data to DB(s) 136, such as toll payment data, records of traffic volume estimates, traffic signal timing information, and so forth. Similarly, one of endpoint devices 111-113 or 121-123 may represent a server of a bank, an insurance entity, a medical provider, a consumer credit entity (e.g., a credit bureau, a credit card company, etc.), a merchant, or the like. In such an example, DB(s) 136 may obtain one or more datasets/data feeds comprising information such as: consumer credit scores, credit reports, purchasing information and/or credit card payment information, credit card usage location information, and so forth. In one example, one of endpoint devices 111-113 or 121-123 may represent a server of an online social network, an online gaming community, an online news service, a streaming media service, or the like. In such an example, DB(s) 136 may obtain one or more datasets/data feeds comprising information such as: connections among users, specific media or types of media accessed, the access times, the durations of media consumption, games played, durations of game play, and so forth. It should be noted that for all of the above examples, the data, records, or other information collected from external entities may also be organized into and referred to as "datasets."

In accordance with the present disclosure, DB(s) 136 may further store metadata associated with various datasets, data schema(s) (e.g., for data formatting, data naming, data size, etc.), and so forth. In addition, with respect to all of the above examples, it should be noted that the datasets may be accessed by server(s) 135 and/or DB(s) 136 via application programming interfaces (API) or other access mechanisms between computing systems, and may include data that is specifically formatted and/or processed so as to maintain user privacy and/or anonymity, and/or such that the data that is accessed is in accordance with user-granted permissions, preferences, or the like, as well as any applicable contractual, legal, and/or regulatory obligations of either the provider(s) of such data, and/or the operator of server(s) 135 and/or DB(s) 136, as an accessor of the data.

In accordance with the present disclosure, DB(s) 136 may also store machine learning algorithms (MLAs) and/or trained MLAs, e.g., MLMs that are trained with training data for various purposes, such as prediction, classification, etc. For instance, DB(s) 136 may store subject MLMs and explanation/interpretation MLMs that may be associated with the subject MLMs. It should be noted that as referred to herein, a machine learning model (MLM) (or machine learning-based model) may comprise a machine learning algorithm (MLA) that has been "trained" or configured in accordance with input training data to perform a particular service. For instance, an MLM may comprise a deep learning neural network, or deep neural network (DNN), a convolutional neural network (CNN), a generative adversarial network (GAN), a decision tree algorithm/model, such as gradient boosted decision tree (GBDT) (e.g., XGBoost, XGBR, or the like), a support vector machine (SVM), e.g., a non-binary, or multi-class classifier, a linear or non-linear classifier, k-means clustering and/or k-nearest neighbor (KNN) predictive models, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs, or other detection models may be implemented in examples of the present disclosure.

In accordance with the present disclosure, an explanation/interpretation MLM may include an RNN, an LSTM network, a transformer network, an encoder-decoder neural network, an encoder neural network, a decoder neural network, a variational autoencoder, a GAN, or the like. In one example, the explanation/interpretation MLM may comprise a bidirectional encoder representations from transformers (BERT) model (e.g., BERT-Base, BERT-Large, etc.), a generative pre-training (GPT) model (e.g. GPT, GPT-2, GPT-3, or the like), or other natural language processing (NLP) model. In accordance with the present disclosure, a subject MLM may have one or more associated explanation/interpretation MLMs.

In one example, DB(s) 136 may further store description information regarding subject MLMs, such as the inputs, outputs, descriptions of the inputs and/or outputs, model parameters or hyperparameters, and so forth. It should be noted that at least some of the inputs may comprise data from datasets stored in DB(s) 136. However, in other examples, the inputs may comprise real-time input data obtained from various sources (e.g., endpoint devices 111-113 and/or 121-123, devices 131-134, server(s) 155, etc.) and applied as input(s) to a subject MLM. In one example, server(s) 135 may further comprise an "explainer," or explanation/interpretation module/package. For instance, server(s) 135 may deploy and run such package to obtain various additional description information (e.g., interpretation/explanation data) of subject MLMs, such as global feature importance values, local (individual input vector) feature importance values, global change impact data for changes or restrictions to an input data set, local feature modification impact data, subject MLM parameters or hyperparameters, model performance metrics, and so forth. This additional description information may also be stored by DB(s) 136 in association with the respective subject MLM(s).

In addition, in one example, DB(s) 136 may store audience profiles, e.g., comprising interpretation criteria for use in training/configuring explanation/interpretation MLMs, such as preferences for one or more types of description information, a maximum length of the explanation text, global results, individual result, global feature importance information, local feature importance information, parameter modification impact information, outlier result information, majority result information, global change impact data, or local feature modification impact data, or the like. In one example, the interpretation criteria may be learned based upon a text/speech corpus associated with a target audience, e.g., legal texts, recordings of medical personnel speaking to patients, medical personnel talking to each other, text of insurance reports, and so forth. In one example, a corpus associated with a target audience may be associated with text or speech instances associated with output data of a subject MLM. In other words, the corpus may comprise text/speech explanation examples associated with specific output samples. For instance, server(s) 135 may train an explanation/interpretation MLM in accordance with interpretation criteria and description information of a subject MLM. The interpretation criteria may be learned as part of the training of the explanation/interpretation MLM, or may be given via user inputs/selections, such as by a developer of the explanation MLM, a member of a target audience, etc.

Further details regarding operations of server(s) 135 for generating, via a second machine learning model, an explanation text providing an interpretation of a first machine learning model in accordance with a set of interpretation criteria and description information of the first machine learning model, are discussed below in connection with the examples of FIGS. 2 and 3.

In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like. As noted above, in one example, one or more of servers 135 may comprise a processing system that is configured to perform operations for generating, via a second machine learning model, an explanation text providing an interpretation of a first machine learning model in accordance with a set of interpretation criteria and description information of the first machine learning model, as described herein. For instance, a flowchart of an example method 300 for generating, via a second machine learning model, an explanation text providing an interpretation of a first machine learning model in accordance with a set of interpretation criteria and description information of the first machine learning model is illustrated in FIG. 3 described in greater detail below.

In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. Thus, these and other modifications are all contemplated within the scope of the present disclosure.

FIG. 2 illustrates an example conceptual architecture of an automated MLM explanation system 200, in accordance with the present disclosure. As illustrated in FIG. 2, the system 200 includes a subject model 201 (e.g., an MLM) which may have various parameters 205 (e.g., including "hyperparameters," etc.). The subject model 201 may be one of various types of MLMs, such as discussed above, and may be configured for any number of tasks such as prediction, detection, classification, etc. However, in any case, the subject model 201 may be trained with training/testing data 210. In accordance with the present disclosure, information about the subject model 201 itself and/or its parameters 205, as well as information regarding the training/testing data 210 may comprise at least part of a set of description information 235 pertaining to the subject model 201. In one example, additional information regarding the subject model 201 may be obtained by an explainer module 230 and included in the description information 235. This may include, global feature importance information, local feature importance information, parameter modification impact information, outlier result information, majority result information, global change impact data, local feature modification impact data, or the like.

For instance, the explainer module 230 may retrain the subject model 201 using at least a first subset of training/testing data 210 to assess the impacts of the changes (e.g., using at least a second subset of training/testing data 210). Alternatively, or in addition, the explainer module 230 may not retrain the subject model 201, but may assess the impacts of changes for certain subset/cohorts using at least a portion of the training/testing data 210 (e.g., at least the portion being used as testing data). For instance, the accuracy of the subject model 201 in a classification task may be higher for certain subsets/demographics than others, or with respect to the overall accuracy of the subject model 201 over all input data instances. Any such differences may be identified and recorded by the explainer module 230 based upon such manipulations of testing input data. Similarly, in one example, the explainer module 230 may retrain the subject model 201 with one or more changed parameters 205, e.g., a different number of trees, a different number of fully-connected layers, a different learning rate, a different number of steps/epochs, a different decay weight, a different batch size, etc., and may identify changes in the performance of the subject model 201 and/or changes in the output data 225 with respect to runtime input data 215. The new performance values, and/or differences in performance, different output data 225 and/or changes in the output data 225 may all be included in the description information 235.

It should be noted that runtime input data 215 may be applied to the subject model 201, where the subject model 201 may provide output data 225 in response to the runtime input data 215. The runtime input data 215 may include at least one input data instance 220. For example, if the subject model 201 is for making predictions/classifications regarding medical images, the input data instance 220 may be a medical image for an individual patient. In addition, in such an example, the output data 225 may include at least one output corresponding to the input data instance 220. As noted above, the runtime input data 215 and the output data 225, or descriptions of the same may also comprise at least part of the description information 235.

It should also be noted that in one example, the explainer module 230 may manipulate the subject model 201 (e.g., by changing parameters and/or training/testing data 210) and applying the input data instance 220 to one or more variants of the subject model 201 to observe any changes in the output data 225 (e.g., a change in classification, a change in top factors/input data features impacting a classification decision, etc.), which again may also be included in the description information 235. In one example, the explainer module 230 may perform various manipulations to obtain various instances of additional description information 235, e.g., any and all types of additional description information 235. However, in another example, a particular set of preferences and/or target audience 250 may be known in advance, in which case the explainer module 230 may use these preferences/target audience information to determine which manipulations to perform and which additional type(s) of description information 235 to obtain. For instance, if a target audience is only interested in knowing whether a change in the input data instance may result in a change in classification from one class to another, the explainer module 230 may not retrain the subject model 201 by changing any of the parameters 205, nor may the explainer module 230 change any of the training/testing data 210 or investigate specific cohorts in the runtime input data 215. Rather, the explainer module 230 may only change input data features of the input data instance 220 to see any changes in an instance of the output data 225 associated with the input data instance 220.

It should be noted that although training/testing data 210 and runtime input data 215 are illustrated as separate instances in FIG. 2, in one example, these data sets may at least partially overlap. For instance, the subject model 201 may comprise a reinforcement learning (RL) model, in which case, runtime input data 215 may become additional training/testing data 210, e.g., when confirmation of the corresponding output data 225 is obtained (e.g., whether a classification, prediction, or other result was correct, how far a predicted value deviates from an actual result, etc.).

As further illustrated in FIG. 2, the system 200 includes an explanation/interpretation model 240 (e.g., an MLM), which may be configured to generate text explanation(s) 255 (natural language explanations) in accordance with the set of interpretation criteria and the description information 235 of the subject model 201. In one example, the explanation/interpretation model 240 may be trained via a corpus of text/speech samples 245 associated with a target audience, e.g., legal texts, recordings of medical personnel speaking to patients, medical personnel talking to each other, text of insurance reports, etc., depending upon the subject matter of the subject MLM and the nature of the target audience (e.g., medical professionals versus patients, insurance entities, legal entities, MLM developers, etc.). In one example, the text/speech samples 245 may be associated with instances of the output data 225 (and respective instances of the runtime input data 215). For instance, users who have been provided with raw interpretation data may verbalize, or record in text, discussion of the interpretation data, which may comprise text/speech samples 245 that are associated with specific instances of output data 225. In one example, the explanation/interpretation model 240 may then be trained with these text/speech samples and learn which aspects of description information 235 that are to be included in text explanation(s) 255.

In another example, text/speech samples 245 may comprise representative texts and/or speech (e.g., which may be converted and stored in text form) relating to a target audience type, but which are not specific to the output data 225 of the subject model 201. In this case, the explanation/interpretation model 240 may learn language style for the target audience, but does not learn the preferences with respect to which aspects of the description information should be included in text explanation(s) 255. For instance, in such case, a particular set of preferences for a target audience 250 may instead be provided by a user, such as a model developer, a user from among the target audience, etc. Alternatively, or in addition, the preferences may be learned from user feedback of users in a target category/audience with respect to text explanation(s) 255. For instance, with regarding to a given one of text explanation(s) 255, a user may indicate with respect to the overall explanation or one or more pieces of information, whether the information was helpful/unhelpful, relevant/not relevant, etc., where the feedback may then be used to tune and/or retrain the explanation/interpretation model 240. Similarly, the explanation/interpretation model 240 may learn which aspects of description information 235 are to be included in text explanation(s) 255 based on users who have manually gone and modified input data features, input data sets (e.g. runtime input data 215), training/testing data 210, and/or parameters 205 to manually collect further explanation/interpretation data, and/or who have requested and/or viewed additional description information 235 not included in an initial text explanation provided to such user.

In another example, the explanation/interpretation model 240 may generate a set of illustrative images or videos. Similar to text explanations, these images and videos may be derived from prior samples (e.g., where text/speech samples 245 may further include image and/or video samples) or description information 235. In one example the text explanation(s) 255 may further comprise video content that includes generic materials that help to inform the target audience 250 about the subject model 201 or the features that were used. In another generated video explanation, the model may choose from a number of variant video samples (e.g. those that include longer explanations, those that are intended for children and have cartoon depictions, those that contain privileged information for a spouse or close relative, etc.) to best generate the explanation 255 according to the target audience 250. In yet another example, the generated video may include components based solely on the descriptive information 235 of the subject model 201 and training/testing data 210 such that an animation is created to show the gradual progress of the output (e.g. likelihood for a customer to return to a retail store) versus the runtime input data 215 (e.g. product prices, additional incentives, duration of a sale). This animation can be rendered by the explanation/interpretation model 240 into a single playable image or video asset or into an interactive presentation (e.g. a web page that jumps to different parts of a predetermined playlist). With no loss of generalization, a fixed or dynamic video asset derived from video samples can also be utilized in the generated explanation.

The explanation/interpretation model 240 may include an RNN, an LSTM network, a transformer network, an encoder-decoder neural network, an encoder neural network, a decoder neural network, a variational autoencoder, a GAN, a BERT model, a GPT model, a reinforcement learning model, or the like. In one example, the explanation/interpretation model 240 may comprise a data-to-text transformer. In one example, the explanation/interpretation model 240 may include a content selection component and text generation component. However, in another example the explanation/interpretation model 240 may learn content selection and text generation simultaneously. For example, the explanation/interpretation model 240 may generate text explanation(s) 255 from description information 235 and interpretation criteria, e.g., preferences and/or an identification of a target audience. The explanation/interpretation model 240 may be trained with training data comprising tuples of description information 235 and text/speech samples 245 associated with respective tuples of the description information. In particular, the explanation/interpretation model 240 may be trained to predict/output text explanation(s) 255 that generally resemble the text/speech samples 245, while being particularized to the specifics of description information 235 of the subject model 201 with respect to runtime input data 215 (e.g., including at least input data instance 220), and in one example, also adhering to the preferences of a target audience (which may be explicitly provided or which may also be learned via feedback/reinforcement learning applied to training/retraining/updating the explanation/interpretation model 240).

In one example, the explanation/interpretation model 240 may be trained using a token-variable substitution process. For instance, the training may use variable placeholders in the place of specific instances of description information 235 contained in text/speech samples. Thus, for example, the explanation/interpretation model 240 may learn to associate conceptual aspects of description information 235 with the desired output text explanation(s) 255, rather than specific values of such (e.g., learning that it is important to include "predication accuracy" in the text explanation(s) 255 rather than "85 percent," "87 percent," "90 percent," "60 percent," etc. being considered as individual concepts, and which may then show up as hallucinations in predicted/output text explanation(s) 255). In other words, a variable for "predication accuracy" may be included in an output text sequence, and then the actual value for "predication accuracy" from description information 235 may be substituted for the variable for a final output as one of the text explanation(s) 255.

As noted above, a user may indicate with respect to the overall explanation or one or more pieces of information in one of the text explanation(s) 255 whether the information was helpful/unhelpful, relevant/not relevant, etc., where the feedback may be used to tune and/or retrain the explanation/interpretation model 240. The user may also interactively explore the explanation/interpretation system to request details or summaries, request alternative explanation types or styles, visualize and zoom in on different parts of the explanation hierarchy, refine explanation criterions, etc. In one example, this user exploration and feedback provision may be implemented as an interactive virtual assistant. Similarly, the explanation/interpretation model 240 may learn which aspects of description information 235 are to be included in text explanation(s) 255 based on users who have manually gone and modified input data features, input data sets (e.g., runtime input data 215), training/testing data 210, and/or parameters 205 to manually collect further explanation/interpretation data, and/or who have requested and/or viewed additional description information 235 not included in an initial text explanation provided to such user. In one example, the process of enhancing model 240 with user interaction and feedback may be implemented with a reinforcement learning framework.

It should be noted that in one example, the explanation/interpretation model 240 may be trained with respect to a single target audience and/or a single set of interpretation criteria, or preferences. However, in another example, explanation/interpretation model 240 may include parallel components/modules which may be specific to different sets of preferences and/or target audiences. In other words, the text explanation(s) 255 may include different explanations with respect to the same runtime input data 215 and the subject model 201, but for different audiences, such as a first explanation for a medical professional and a second explanation for a patient, or a first explanation for a model developer, a second explanation for a financial professional, a third explanation for an account holder, retail investor, or the like, and so on. In one example, the different explanations may be generated by similar but separately trained models, which may comprise components of the explanation/interpretation model 240. In other words, the explanation/interpretation model 240 may comprise an ensemble model, for instance, where different sub-models may be activated depending upon the target audience. Alternatively, or in addition, the explanation/interpretation model 240 may be trained with a set of preferences and/or a target audience type comprising one or more additional inputs/predictors and where different text/speech samples 245 may be associated with different preferences and/or target audience types for model training.

It should be noted that the foregoing is just one example of an architecture of an automated MLM explanation system 200 and that other, further, and different configurations, or other components or features may be provided in accordance with the present disclosure. As just one example, a user interface may provide, in addition to the ability to give feedback on text explanation relevance, correctness, etc., an opportunity for users to expand a provided one of text explanation(s) 255. For instance, an initially provided text explanation may be used as a seed for generating additional sentences via explanation/interpretation model 240. For instance, explanation/interpretation model 240 may generate, in textual form, additional details regarding aspects of the description information 235 and/or may select to include in the expanded text new aspects of the description information 235 not previously provided. Thus, these and other modification are all contemplated within the scope of the present disclosure.

Figure 3:
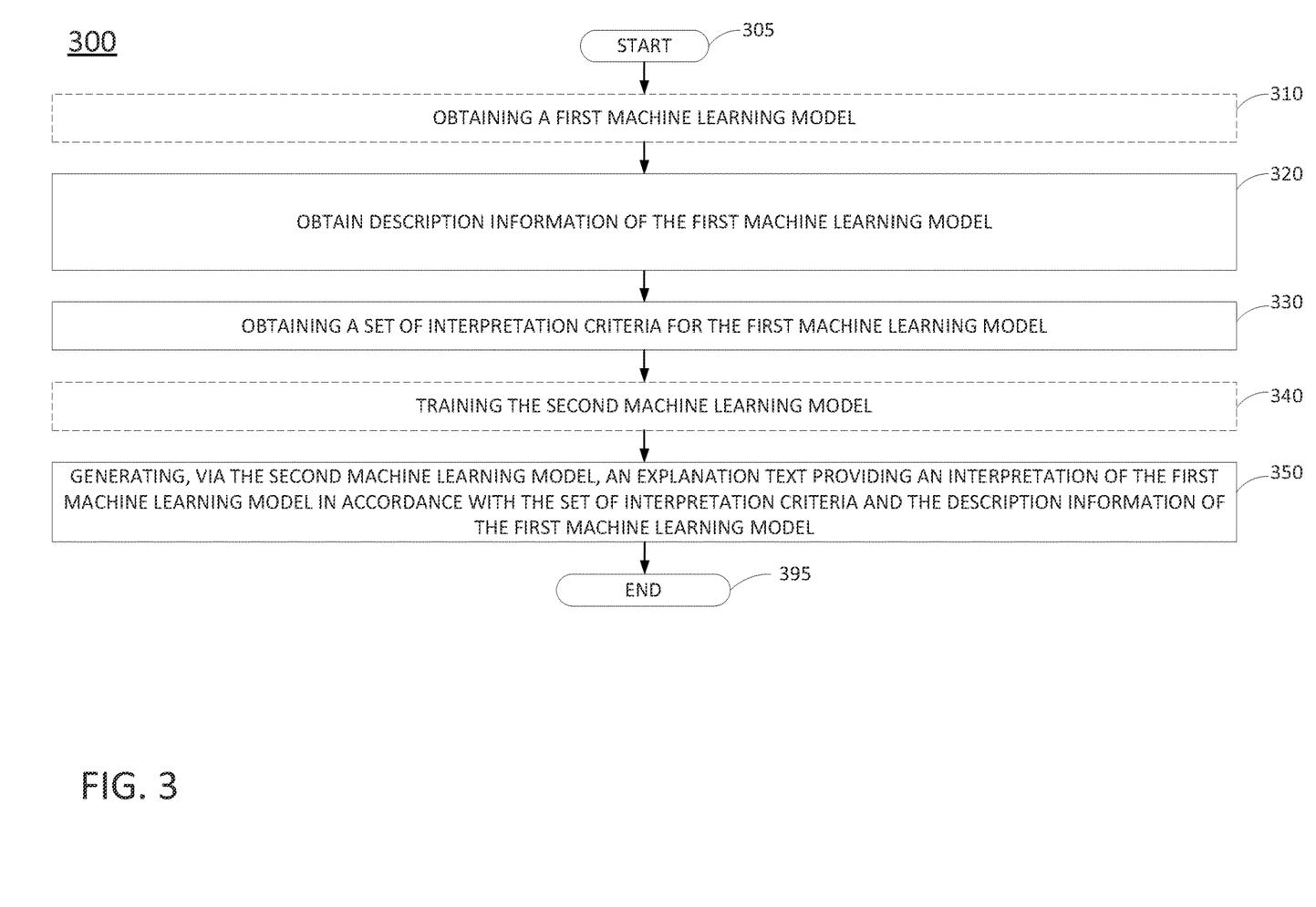
FIG. 3 illustrates a flowchart of an example method for generating, via a second machine learning model, an explanation text providing an interpretation of a first machine learning model in accordance with a set of interpretation criteria and description information of the first machine learning model, according to the present disclosure.

FIG. 3 illustrates a flowchart of an example method 300 for generating, via a second machine learning model, an explanation text (and in some examples alternatively or additionally generating image(s), video, animation, or interactive virtual assistant) providing an interpretation of a first machine learning model in accordance with a set of interpretation criteria and description information of the first machine learning model, according to the present disclosure. In one example, the method 300 is performed by a component of the system 100 of FIG. 1, such as by server(s) 135, and/or any one or more components thereof (e.g., a processor, or processors, performing operations stored in and loaded from a memory or distributed memory system), or by server(s) 135, in conjunction with one or more other devices, such as server(s) 155, and so forth. In one example, the method 300 may be performed by system 200 of FIG. 2. In one example, the steps, functions, or operations of method 300 may be performed by a computing device or processing system, such as computing system 400 and/or a hardware processor element 402 as described in connection with FIG. 4 below. For instance, the computing system 400 may represent at least a portion of a platform, a server, a system, and so forth, in accordance with the present disclosure. In one example, the steps, functions, or operations of method 300 may be performed by a processing system comprising a plurality of such computing devices as represented by the computing system 400. For illustrative purposes, the method 300 is described in greater detail below in connection with an example performed by a processing system (e.g., deployed in a telecommunication network). The method 300 begins in step 305 and may proceed to optional step 310 or to step 315.

At optional step 310, the processing system may obtain a first machine learning model (MLM). For instance, the first MLM may be of any of the abovementioned types of MLMs, or the like, and may be trained for and deployed to provide predictions, forecasts, classifications, etc. such as for making medical classification predictions, making network access decisions or recommendations (e.g., allow, deny, challenge, etc.), identifying people or objects in image data, generating weather forecasts, and so forth. The first MLM may be provided to the processing system by a user seeking to obtain an explanation/interpretation regarding the first MLM. Alternatively, or in addition, the processing system may be directed as to where or how to access the first MLM, such as a uniform resource locator (URL) identifying a network-accessible repository from which the first MLM may be obtained.

At step 320, the processing system obtains description information of the first MLM. In one example, the description information may be obtained from a network-accessible repository from which the first MLM may be obtained, or from a different location. In one example, the description information may be obtained from an "explainer," or explanation/interpretation module/package. Alternatively, or in addition, the processing system may generate description information via analysis of the first MLM. For instance, the processing system may comprise an "explainer," e.g., the processing system may run an explanation/interpretation module/package. In such case, step 320 may comprise generating interpretation data of the first MLM.

The description information may include at least one input of the first MLM, or a description thereof, and/or at least one output of the first MLM, or a description thereof. In one example, the at least one output comprises a plurality of outputs. In such case, the description of the at least one output may comprise aggregate data of the plurality of outputs, e.g., a sum, mean, median, top category or categories, lowest category or categories, etc. In one example, the aggregate data may alternatively or additionally include an accuracy metric of the first MLM or similar performance data. The at least one input may comprise a training data input of the first MLM, a testing data input of the first MLM (e.g., in one example, also referring to what may sometime be termed "validation" data), and/or a runtime data input of the first MLM. The description information may further include a set of parameters, e.g., hyperparameters and/or learned parameters, of the first MLM.

The description information may also include learned metrics, or "interpretation data" of the first MLM such as global feature importance values, local (individual input vector) feature importance values for the at least one input, global change impact data for changes or restrictions to an input data set including the at least one input, local feature modification impact data for the at least one input, and so forth. For instance, global feature importance values can be determined at training/testing time and/or at runtime over a set of runtime inputs (input vectors). Local feature importance values may be determined at runtime and may relate to which features are most important/impactful for an individual classification, prediction, output value, etc. with respect to an input (e.g., an input vector). Global input data set change impact data, may quantify what happens to the overall output set when input data is restricted to certain ranges, categories, or values for one or more features. Likewise, local feature modification impact data may quantify what happens when one or more features are changed for the at least one input vector and set to certain values or categories (e.g., change age from 18-35 to 35+, change location from northeast to southeast, change starting value to 400,000 from 200,000, etc.).

Similarly, in one example, step 320 may include changing training and/or testing data of the first MLM and assessing impacts on a set of outputs from a set of runtime inputs (or an impact on the at least one output (e.g., a change to the at least one output by applying the at least one input to the first MLM that is changed modified via the different training/testing data set)). In one example, step 320 may include applying the at least one input to the first MLM to generate at least a first output, changing at least one parameter of a set of parameters of the first MLM (e.g., a hyperparameter, or "tunable" parameter), retraining the first MLM with the at least one parameter that is changed (e.g., with training/testing data remaining the same), and applying the at least one input to the first MLM that is retrained to generate at least a second output. For instance, the parameter modification impact data mentioned above may comprise or may be based on a difference between the at least the first output and the at least the second output.

In one example, the applying of the at least one input to the first MLM that is modified may comprise applying a plurality of inputs to the first MLM that is modified to generate a plurality of outputs of the first MLM that is modified (e.g., parameter modification impact data can be with respect to individual input data, e.g., an individual input data vector), or with respect to a number of inputs. In one example, the parameter modification impact data may comprise or may be based on aggregated data from the plurality of outputs.

In one example, step 320 may include applying the at least one input to the first MLM to generate at least a first output, adjusting at least one feature of the at least one input to generate at least a second input, and applying the at least the second input to the first MLM to generate at least a second output. For instance, the local feature modification impact data for the at least one input may be based on a difference between the at least the first output and the at least the second output. In other words, step 320 may comprise generating the local feature modification impact data for the at least one input based on a difference between the at least the first output and the at least the second output. In one example, step 320 may include applying an input set to the first machine learning model to generate a first output set, and applying a second input set to the first MLM to generate a second output set, where the second input set is different from the first input set. For instance, the global change impact data for changes or restrictions to the input data set may be based on a difference between the at least the first output set and the at least the second output set.

In one example, feature importance values may be determined at a training time of the first MLM or at a runtime. For instance, feature importance values may be determined via reinforcement learning (RL) and/or during a training phase, where feature weights or the like may correspond to feature importance. In another example, step 320 may include training a secondary MLM to approximate the first MLM and which can learn feature importance from outputs based on inputs. In still another example, an external process may generate the same interpretation data, which may be obtained by the processing system at step 320.

At step 330, the processing system obtains a set of interpretation criteria. For instance, the set of interpretation criteria may comprise a preference for one or more types of description information and/or a maximum length of the explanation text. For example, a preference for the one or more types of description information may comprise a preference for at least one of: global results, individual results, global feature importance information, local feature importance information, parameter modification impact information, outlier result information, majority result information, global change impact data, local feature modification impact data, or the like.

In one example, the set of interpretation criteria may be associated with a target audience type. Alternatively, or in addition, the set of interpretation criteria may comprise the target audience type. For example, the target audience type may comprise a machine learning model developer or an entity associated with at least one of: an input of the first MLM or an output of the first MLM (e.g., an individual, family, group, organization, etc.). The target audience type may comprise for example a legal audience, a medical audience, an insurance audience, a marketing audience, a news audience, or the like.

At optional step 340, the processing system may train a second MLM (e.g., an explanation interpretation MLM). For instance, the second MLM may be for generating an explanation text (natural language/textual explanation) providing an interpretation of the first MLM in accordance with the set of interpretation criteria and the description information of the first MLM. It should be noted that although the terms, "first," "second," "third," etc., may be used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," does not necessarily imply a particular number of those items corresponding to those numerical values. In addition, the use of the term "third" for example, does not imply a specific sequence or temporal relationship with respect to a "first" and/or a "second" of a particular type of item, unless otherwise indicated.

In various examples, the second MLM may comprise an RNN, an LSTM network, a transformer network, an encoder-decoder neural network, an encoder neural network, a decoder neural network, a variational autoencoder, a GAN, a BERT model, a GPT model or the like. In one example, the second MLM may incorporate a Shapley Additive Explanation (SHAP) model/framework, or a Local Interpretable Model-agnostic Explanations (LIME) model/framework. For instance, the content selection may be in accordance with SHAP, LIME, or the like. As noted above, in one example, the second MLM may comprise a content selection component and text generation component. However, in another example the second MLM may be trained and may learn content selection and text generation simultaneously. In addition, as discussed above, the second MLM may be trained using a token-variable substitution process. In one example, the training of optional step 340 may be in accordance with an example text corpus. In one example, the example text corpus may be associated with at least one target audience. For instance, where the text corpus is associated with multiple target audiences, the second MLM may learn output style, diction, content (description information)), etc., that is specific to the respective target audiences. Alternatively, or in addition, the second MLM may be further trained in accordance with the set of interpretation criteria. For example, the set of interpretation criteria may associated with a target audience (e.g., comprising at least one user).

In another example, the example text corpus may include images or videos that correlate to the explanations within the corpus. For example, the corpus may include textual descriptions coupled with educational images that are created to explain the topic of diabetes for adults, children, and elders. In another example, the example text corpus may include images or videos that help to explain the output of an MLM. For example, one or more educational videos may be created that demonstrate the efficacy levels of a construction standard score. The videos may thus be coupled such that a low construction standard score (or poor construction) may demonstrate fast wear or fragility of a constructed building or roadway, whereas a high construction standard score may demonstrate extreme conditions or anomalous stress test conditions. This type of image or video content may help a user select the right model configuration according to the user's interpretation of a previously numerical score (e.g. the construction standard score). It should be noted that while these image and video samples may exist in the example text corpus, they may still be selected where appropriate for the specific target audience.

In one example, the example text corpus associated with the target audience may be associated with text or speech instances associated with output data of the first MLM. For instance, each text or speech instance may be associated with a respective instance of output data of the first MLM. In one example the text corpus may comprise, for each text or speech instance, a representation of the text or speech, and may additionally include one or more aspects of description information, e.g., a respective instance of output data of the first MLM, a respective instance of input data to the first MLM associated with the respective instance of the output data, and/or other aspects of description information associated therewith, e.g., model performance metrics, parameters and/or hyperparameters, feature importance values, etc.

However, in another example, the corpus may comprise representative texts and/or speech (e.g., which may be converted and stored in text form) relating to a target audience type (or types), but which are not specific to the output data of the first MLM. In this case, the second MLM may learn language style(s) for the target audience(s), but does not learn the preference(s) with respect to which aspects of the description information should be included in a resultant text explanation. Alternatively, or in addition, the second MLM may be trained and may learn to include description or interpretation data based on users who have been provided with raw interpretation data and who have gone on to verbalize, or record in text, discussion of the interpretation data, and/or based on users who have manually gone and modified input data features, input data sets, training/testing data sets, and/or model parameters to collect interpretation data and who then engaged in providing text or speech discussing these additional results. In one example, the second machine learning model may further be trained based on user feedback in accordance with a reinforcement learning framework. For instance, the processing system may collect affirmative user feedback or implicit measures of success/user satisfaction, to further improve on the second explanation model, and/or to better personalize to a user or user audience segment, e.g., via such a reinforcement learning framework.

At step 350, the processing system generates, via the second MLM, an explanation text (natural language/textual explanation, and/or image, video, or interactive virtual assistant) providing an interpretation of the first MLM in accordance with the set of interpretation criteria and the description information of the first MLM. For instance, the description information may be obtained at step 320 and may include at least one input of the first MLM, or a description thereof, and/or at least one output of the first MLM, or a description thereof, aggregate data of a plurality of outputs, learned metrics, or "interpretation data" of the first MLM such as global feature importance values, local (individual input vector) feature importance values for the at least one input, global change impact data for changes or restrictions to an input data set including the at least one input, local feature modification impact data for the at least one input, and so forth. From among this description information, the second MLM may select one or more aspects for including in the explanation text. For instance, the selecting may be in accordance with the interpretation criteria as additional input factors of the second MLM. Alternatively, the interpretation criteria may cause the processing system to select a particular module or sub-component of the second MLM (e.g., a sub-model that is particularized to the target audience and/or set of interpretation criteria) which is to be applied to the description information as an input to the second MLM. In addition to selecting the aspects of description information to include in the explanation text, step 350 may also include generating text-from-data, e.g., as described above, and as the second MLM is configured/trained to provide. In one example, the explanation text may include a video explanation. Such as a concatenated video explanation that is playable as a fixed, single stream or as an interactive, dynamic video playlist derived from the description information.

Following step 350, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300, such as steps 320 and 350 for additional input data, and so forth. In one example, the interpretation data that may be obtained at step 320 may generated, calculated, and/or obtained based upon the set of interpretation criteria. For example, instead of simply generating any and all types of interpretation data, the set of interpretation criteria may inform as to which interpretation data should be generated, and hence which manipulations to apply. In such case, step 330 may precede step 320, or the method may include an additional step following step 330 and prior to optional step 340 and/or step 350 in which the interpretation data may be obtained and added to the description information already obtained at step 320.

In one example, the method 300 may be expanded to include generating a speech/audio output from the explanation text, presenting the audio output to a user, etc. In one example, the method 300 may include obtaining a user input requesting additional description information, generating the additional description information (e.g., in text/natural language format), providing the additional text/natural language description to the user, and so forth. In one example, the method 300 may include providing the explanation text along with or in addition to charts, graphs, or other visual representations of the description information, e.g., including the output(s) of the first MLM, the parameters of the first MLM, interpretation data of the first MLM such as most important factors, etc., and so on. In one example, the method 300 may be expanded to include obtaining user feedback regarding one or more aspects of the explanation text and retraining the second machine learning model using the feedback. In one example, the method 300 may be expanded or modified to include steps, functions, and/or operations, or other features described above in connection with the example(s) of FIGS. 1 and 2, or as described elsewhere herein. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

Figure 4:
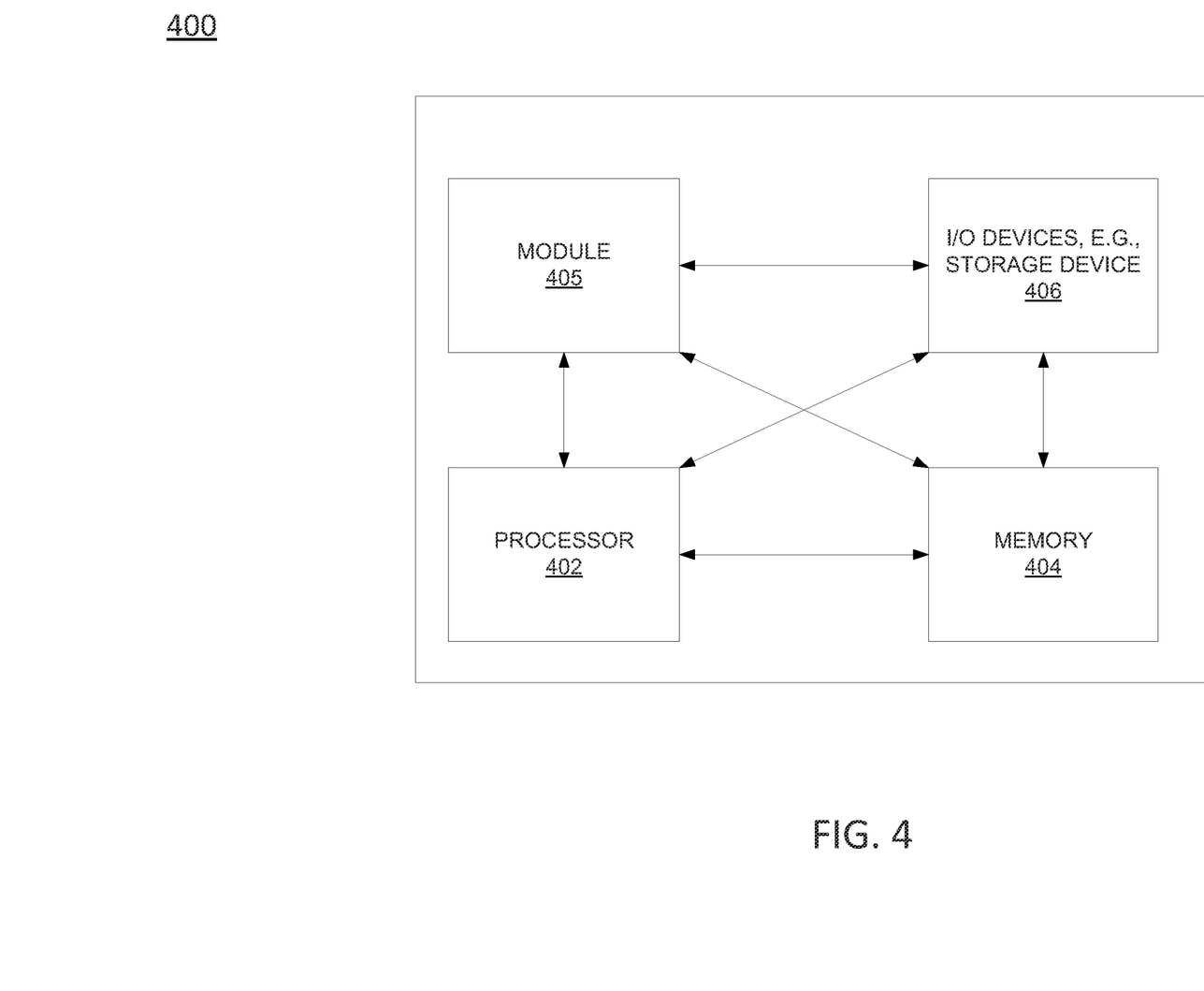
FIG. 4 illustrates a high-level block diagram of a computing device specially programmed to perform the functions described herein.

FIG. 4 depicts a high-level block diagram of a computing system 400 (e.g., a computing device or processing system) specifically programmed to perform the functions described herein. For example, any one or more components, devices, and/or systems illustrated in FIG. 1 or FIG. 2, or described in connection with FIG. 3, may be implemented as the computing system 400. As depicted in FIG. 4, the computing system 400 comprises a hardware processor element 402 (e.g., comprising one or more hardware processors, which may include one or more microprocessor(s), one or more central processing units (CPUs), and/or the like, where the hardware processor element 402 may also represent one example of a "processing system" as referred to herein), a memory 404, (e.g., random access memory (RAM), read only memory (ROM), a disk drive, an optical drive, a magnetic drive, and/or a Universal Serial Bus (USB) drive), a module 405 for generating, via a second machine learning model, an explanation text providing an interpretation of a first machine learning model in accordance with a set of interpretation criteria and description information of the first machine learning model, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 402 is shown, the computing system 400 may employ a plurality of hardware processor elements. Furthermore, although only one computing device is shown in FIG. 4, if the method(s) as discussed above is implemented in a distributed or parallel manner for a particular illustrative example, e.g., the steps of the above method(s) or the entire method(s) are implemented across multiple or parallel computing devices, then the computing system 400 of FIG. 4 may represent each of those multiple or parallel computing devices. Furthermore, one or more hardware processor elements (e.g., hardware processor element 402) can be utilized in supporting a virtualized or shared computing environment. The virtualized computing environment may support one or more virtual machines which may be configured to operate as computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer-readable instructions pertaining to the method(s) discussed above can be used to configure one or more hardware processor elements to perform the steps, functions and/or operations of the above disclosed method(s). In one example, instructions and data for the present module 405 for generating, via a second machine learning model, an explanation text providing an interpretation of a first machine learning model in accordance with a set of interpretation criteria and description information of the first machine learning model (e.g., a software program comprising computer-executable instructions) can be loaded into memory 404 and executed by hardware processor element 402 to implement the steps, functions or operations as discussed above in connection with the example method(s). Furthermore, when a hardware processor element executes instructions to perform operations, this could include the hardware processor element performing the operations directly and/or facilitating, directing, or cooperating with one or more additional hardware devices or components (e.g., a co-processor and the like) to perform the operations.

The processor (e.g., hardware processor element 402) executing the computer-readable instructions relating to the above described method(s) can be perceived as a programmed processor or a specialized processor. As such, the present module 405 for generating, via a second machine learning model, an explanation text providing an interpretation of a first machine learning model in accordance with a set of interpretation criteria and description information of the first machine learning model (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium may comprise a physical device, a hardware device, or a device that is discernible by the touch. More specifically, the computer-readable storage device or medium may comprise any physical devices that provide the ability to store information such as instructions and/or data to be accessed by a processor or a computing device such as a computer or an application server.

While various examples have been described above, it should be understood that they have been presented by way of example only, and not limitation. Thus, the breadth and scope of a preferred example should not be limited by any of the above-described examples, but should be defined only in accordance with the following claims and their equivalents.

What is claimed is:

1. A method comprising:
    obtaining, by a processing system including at least one processor, description information of a first machine learning model implemented by the processing system, wherein the description information includes interpretation data of the first machine learning model, and wherein the obtaining the description information comprises generating the interpretation data of the first machine learning model by:
        retraining the first machine learning model using at least a first subset of data that was used to train the first machine learning model; and
        recording changes to one or more outputs for a set of one or more inputs to the first machine learning model as a result of the retraining, wherein the interpretation data of the first machine learning model includes the changes to the one or more outputs for the set of one or more inputs;
obtaining, by the processing system, a set of interpretation criteria for the first machine learning model; and
generating, by the processing system via a second machine learning model implemented by the processing system, an explanation text providing an interpretation of the first machine learning model in accordance with the set of interpretation criteria and the description information of the first machine learning model.

2. The method of claim 1, further comprising:
obtaining the first machine learning model.

3. The method of claim 1, wherein the description information comprises at least one of:
at least one input of the first machine learning model;
a description of the at least one input of the first machine learning model;
at least one output of the first machine learning model;
a description of the at least one output of the first machine learning model; or
a set of parameters of the first machine learning model.

4. The method of claim 3, wherein the at least one output comprises a plurality of outputs, wherein the description of the at least one output comprises aggregate data of the plurality of outputs.

5. The method of claim 3, wherein the at least one input comprises:
a training data input to the first machine learning model;
a testing data input to the first machine learning model; or
a runtime data input to the first machine learning model.

6. The method of claim 3, wherein the interpretation data comprises at least one of:
global feature importance values;
individual input vector feature importance values for the at least one input;
global change impact data for changes or restrictions to an input data set including the at least one input; or
individual input vector feature modification impact data for the at least one input.

7. The method of claim 1, wherein the explanation text includes a video explanation.

8. The method of claim 1, wherein the interpretation data comprises at least one of:
global feature importance values;
individual input vector feature importance values for the at least one input;
global change impact data for changes or restrictions to an input data set including the at least one input;
individual input vector feature modification impact data for the at least one input; or
parameter modification impact data for the first machine learning model.

9. The method of claim 1, wherein the interpretation data is generated based upon the set of interpretation criteria.

10. The method of claim 1, wherein the set of interpretation criteria comprises at least one of:
a preference for one or more types of description information; or
a maximum length of the explanation text.

11. The method of claim 10, wherein the preference for the one or more types of description information comprises a preference for at least one of:
global results;
individual results;
global feature importance information;
individual input vector feature importance information;
parameter modification impact information;
outlier result information;
majority result information;
global change impact data; or
individual input vector feature modification impact data.

12. The method of claim 1, wherein the set of interpretation criteria is associated with a target audience type or comprises the target audience type.

13. The method of claim 1, wherein the second machine learning model comprises:
a recurrent neural network;
a long short-term memory network;
a transformer network;
an encoder-decoder neural network;
an encoder neural network;
a decoder neural network;
a variational autoencoder;
a generative adversarial network; or
a reinforcement learning model.

14. The method of claim 1, further comprising:
training the second machine learning model.

15. The method of claim 14, wherein the second machine learning model is trained in accordance with at least one of:
an example text corpus; or
the set of interpretation criteria.

16. The method of claim 14, wherein the second machine learning model is trained based on user feedback in accordance with a reinforcement learning framework.

17. The method of claim 1, wherein the second machine learning model comprises a content selection component and text generation component.

18. A non-transitory computer-readable medium storing instructions which, when executed by a processing system including at least one processor, cause the processing system to perform operations, the operations comprising:
obtaining description information of a first machine learning model implemented by the processing system, wherein the description information includes interpretation data of the first machine learning model, and wherein the obtaining the description information comprises generating the interpretation data of the first machine learning model by:
retraining the first machine learning model using at least a first subset of data that was used to train the first machine learning model; and
recording changes to one or more outputs for a set of one or more inputs to the first machine learning model as a result of the retraining, wherein the interpretation data of the first machine learning model includes the changes to the one or more outputs for the set of one or more inputs;
obtaining a set of interpretation criteria for the first machine learning model; and
generating, via a second machine learning model implemented by the processing system, an explanation text providing an interpretation of the first machine learning model in accordance with the set of interpretation criteria and the description information of the first machine learning model.

19. A device comprising:
a processing system including at least one processor; and
a computer-readable medium storing instructions which, when executed by the processing system, cause the processing system to perform operations, the operations comprising:

obtaining description information of a first machine learning model implemented by the processing system, wherein the description information includes interpretation data of the first machine learning model, and wherein the obtaining the description information comprises generating the interpretation data of the first machine learning model by:
- retraining the first machine learning model using at least a first subset of data that was used to train the first machine learning model; and
- recording changes to one or more outputs for a set of one or more inputs to the first machine learning model as a result of the retraining, wherein the interpretation data of the first machine learning model includes the changes to the one or more outputs for the set of one or more inputs;

obtaining a set of interpretation criteria for the first machine learning model; and generating, via a second machine learning model implemented by the processing system, an explanation text providing an interpretation of the first machine learning model in accordance with the set of interpretation criteria and the description information of the first machine learning model.

20. The device of claim 19, wherein the operations further comprise:
obtaining the first machine learning model.

* * * * *